March 8, 1949. J. A. MATOUSEK 2,463,707
PIPE COUPLING
Filed July 3, 1947

INVENTOR
J. A. Matousek
BY Robb & Robb
Attorneys.

Patented Mar. 8, 1949

2,463,707

UNITED STATES PATENT OFFICE 2,463,707

PIPE COUPLING

John A. Matousek, Parma, Ohio

Application July 3, 1947, Serial No. 758,952

1 Claim. (Cl. 285—166)

My present invention comprises a novel and improved form of coupling adapted to provide a tightly sealed connection for relatively thin-walled pipe or tubing.

A principal object of my invention is to provide a special form of pipe engaging member designed to extend circumferentially around the pipe or tubing to be coupled and adapted, in the coupling operation, to be compressed into tight sealing engagement with said tubing and with the pipe or tubing receiving member without causing fracture of the tubing with which the pipe engaging member is associated.

Another object of the invention is to provide such a pipe engaging member which will continue to have tight seating engagement with the tubing receiving member although the coupling is made and unmade many times in the course of its use.

The coupling of my invention essentially comprises a pipe receiving member or body, a member circumferentially engaging the pipe or tubing, and a nut having threaded connection with the pipe receiving member or body and adapted to co-operate with the pipe engaging member to draw the parts into coupling relation. The pipe engaging member is of novel form and essentially consists of an integral sleeve or collar adapted to circumferentially engage the pipe or tubing and having a cylindrical portion and a conically tapered portion with a weakened connection therebetween permitting deformation of a cylindrical portion relative to the conically tapered portion.

The pipe receiving member or body of the coupling of my invention has an internal shoulder or ledge adapted to engage the pipe or tubing receiving therein and extending away from the said ledge or shoulder is a flared or conically tapered portion of substantially the same configuration and approximately corresponding to the conically tapered portion of the pipe engaging member. The nut having threaded co-operation with the pipe receiving member of the coupling co-operates with the pipe engaging member circumferentially engaging the pipe to be coupled, when the latter is engaged against the shoulder aforesaid, to cause the pipe engaging member to be forced inwardly of the conically tapered portion of the pipe receiving member with a wedging action upon the cylindrical portion of the pipe engaging member deforming the same so that it is compressed into the tubing and so that the outer surface of said cylindrical portion tends to assume tapered configuration of the tapered portion of said pipe engaging member. The latter portion of the pipe engaging member being forced into the corresponding portion of the pipe receiving member serves to limit the radial compression of the cylindrical portion of the pipe engaging member with reference to the pipe and insures a tight sealing engagement of the pipe engaging member with the pipe receiving member.

Other objects, advantages and features of the invention become apparent from the following detailed description of the invention taken in conjunction with the accompanying drawings in which—

Figure 1:
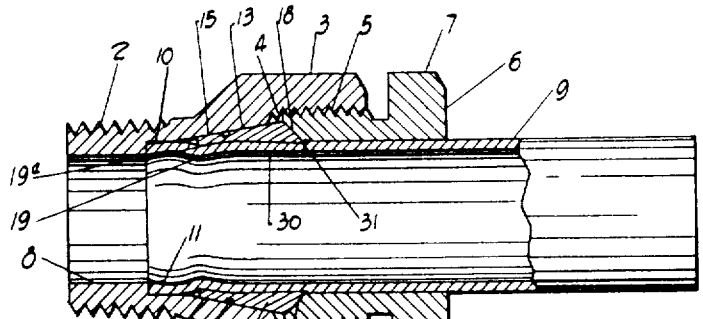
Figure 1 is a longitudinal sectional view of the parts of the coupling in assembled relation with a length of pipe or tubing, the parts being shown in fully coupled relation.

Now referring to the drawing, the coupling, as shown in Figure 1, comprises a pipe receiving member or body designated by the numeral I having an exterior pipe thread 2 at one end thereof and a hexagonal or other non-circular portion 3 to provide a wrench-hold. The pipe receiving member I has interior screw threads 4 for co-operation with the correspondingly threaded portion 5 of the coupling nut 6 which is likewise provided with the hexagonal or the non-circular portion 7 providing a wrench-hold.

Extending axially through the body of the pipe receiving member I is a passage 8 having a diameter substantially equal to the inside diameter of a pipe or tubing 9 to be coupled. The bore of the pipe receiving member I includes a cylindrical portion 10 immediately adjacent to and of greater diameter than the passage 8 thereby providing a shoulder or ledge 11 to be engaged by the end of the pipe 9, the diameter of the cylindrical bore 10 being substantially equal to the outer diameter of the pipe 9. The bore of the pipe receiving member I has an outwardly flared portion 11a extending away from the enlarged cylindrical portion 10, said outwardly flared portion 11a being of conically tapered configuration and constituting a seat for sealing engagement with the correspondingly conically tapered peripheral portion 13 of the pipe engaging member 12.

The pipe engaging member 12 is adapted to circumferentially engage the pipe 9 and to this end the member 12 has a bore 14 whose diameter is substantially equal to or slightly larger than the exterior diameter of the pipe 9 whereby when the member 12 is circumferentially engaged with the pipe 9 the member 12 is somewhat loose fitting to permit relative axial movement between the parts. The member 12 has a portion 15 the outer surface of which is cylindrical and the outer diameter of which is approximately equal to the minimum outer diameter of the conically tapered portion 13, the outer diameter of the cylindrical portion 15 being consequently somewhat greater than the minimum diameter of the conically tapered seat portion 11a of the bore of the pipe receiving member 1. It is to be especially noted that the conically tapered outer surface of the portion 13 of the member 12 is adapted to fit snugly within the conically tapered seat portion 11a of the pipe receiving member 1. Pipe engaging sleeve or collar member 12 is formed with an annular recess 16 intermediate the portions 13 and 15, said recess 16 reducing the wall thickness of the member 12 to provide a weakened connection between the portions 13 and 15 permitting deformation of the portion 15 relative to the portion 13 of said member 12.

The outer end of the member 12 has a conically tapered end edge surface 17 being adapted to be engaged by similarly conically tapered surface 18 at the inner end edge of the nut 7.

In the use of the coupling of my invention, the nut 6 and the sleeve or collar member 12 are slid over the end of the pipe or tubing 9 and the end of the latter is inserted into the pipe receiving member 1 until it abuts the ledge or shoulder 11. Next the nut 6 is screwed into the threaded portion 4 of the member 1 and in this process the conically tapered surface 18 of the nut 6 engages the similarly tapered end edge 17 of the sleeve member 12 causing the latter to be moved leftwardly relative to the pipe or tubing 9 forcing the cylindrical portion 15 of the member 12 into the conically tapered seat portion 11a of the member 1. As the portion 15 of the sleeve 12 is forced into the seat 11a the conical taper of the latter causes the portion 15 of the sleeve 12 to be compressed radially deforming the portion 15 relative to the portion 13 of the sleeve 12 tending to cause the exterior cylindrical surface of the portion 15 to conform with the conically tapered exterior surface of the portion 13 of the sleeve 12. This action causes the radial compression or squeezing of the portion 15 of the sleeve 12 into the pipe or tubing 9 resulting in circumferential radial inward deformation of the pipe or tubing 9 as indicated at 19 adjacent the end edge 20 of the sleeve 12. The deformation of the portion 15 of the sleeve 12 relative to the portion 13 is permitted by the weakened connection between these portions provided by the annular recess 16.

While the radial inward compression of the portion 15 of the member 12 causes the end edge 20 to dig slightly into the metal of the exterior of the tubing 9 as at 19a, the extent of this digging and deforming action with respect to the pipe or tubing 9 is limited by the tight seating engagement of the conically tapered surface of the portion 13 of the sleeve 12 with the tapered seat 11a. The tight seating engagement of the portion 13 of the sleeve 12 with the seat 11a positively limits the inward movement of the sleeve 12 relative to the tapered seat 11a so that extreme deformation of the tubing 9 which might result in fracture thereof is prevented.

Figure 2:
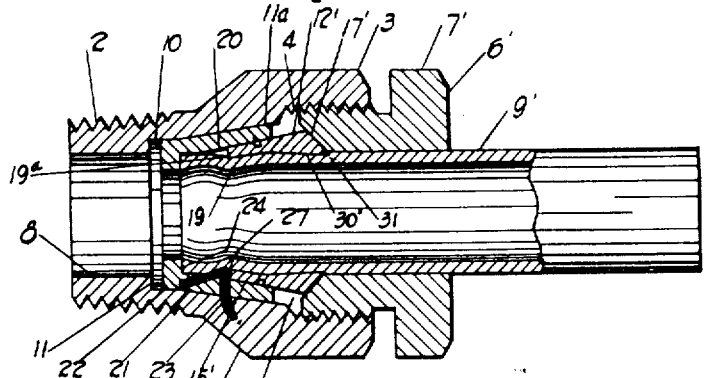
Figure 2 is a longitudinal sectional view, similar to Figure 1 but showing a modification in reference to the employment of an adapter member having a conically tapered interior seating portion for use when coupling smaller sizes of pipe with larger size coupling part.
Figure 3:
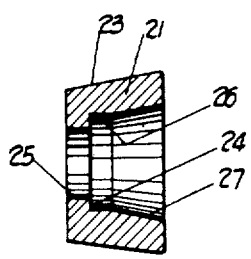
Figure 3 is a longitudinal sectional view through the adapter member alone.
Figure 4:
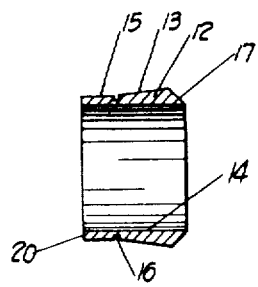
Figure 4 is a longitudinal sectional view through the pipe engaging member alone.

The modified coupling illustrated in Figure 2 comprises the same elements as previously described, namely, the pipe receiving member 1, the nut 6, the pipe engaging member 12', and the pipe or tubing 9' with which the member 12' is adapted to be circumferentially engaged. However in this modified coupling of Figure 2 the pipe or tubing 9' has an exterior diameter smaller than the cylindrical portion 10 of the member 1 and even smaller than the diameter of the passage 8 therein. For the purpose of coupling this smaller diameter pipe 9 in the larger diameter pipe receiving member 1, I utilize an adapter member 21 having an exterior cylindrical surface 22 of a diameter substantially equal to the diameter of the cylindrical portion 10 of the member 1, said adapter member 21 having a conically tapered exterior surface 23 corresponding to the taper of the seat portion 11a of the member 1. The adapter member 21 is formed with an internal shoulder or ledge 24 with which the end of the pipe 9' is adapted to engage when the adapter member is disposed within the pipe receiving member 1 as shown in Figure 2. The adapter member 21 is provided with a central bore forming the passage 25 and the enlarged cylindrical portion 26 approximating the exterior diameter of the pipe or tubing 9'. Extending from the portion 26 is the outwardly flared or conically tapered seat 27 having a conical taper substantially corresponding to that of the portion 13' of the sleeve member 12'. The cylindrical portion 15' of the sleeve 12' functions in the same manner as previously described, being radially inwardly compressed on to the tube 9' when caused to enter the tapered seat 27 of the adapter 21 when the nut 6' is tightened up relative to the pipe receiving member 1 into engagement with the sleeve 12' as shown in Figure 2, the sleeve and nut being disposed upon the tubing 9 and the latter disposed within the adapter 21 as shown.

It is notable that the cylindrical portion 15 or 15' of the sleeve 12 or 12' is of relatively short axial length and I have found it preferable to make the axial length of this portion about $\tfrac{1}{16}$", irrespective of the diameter of the sleeve or the other dimensions thereof. This insures sufficient squeezing of the cylindrical portion 15 or 15' onto the tube 9 or 9' without undue deformation thereof at the point 19 such as to cause fracture. The axial length of the portions 15 and 15' has been exaggerated in the drawings.

It is noted also that as the tapered portion 13 or 13' of the sleeve 12 or 12' is forced into the tapered seat 11a or 27, portion 13 or 13' is also thereby radially inwardly compressed and squeezed onto the tube 9 or 9' with slight deformation of the tube as at 30 or 30', the outer edge of the sleeve being caused to dig slightly into the metal of the tube 9 or 9' as at 31 or 31'. This prevents backing of the sleeve axially relative to the tube as the sleeve is forced into the tapered seat 11a or 27. In order to assist the action of radial inward compression of the tapered portion 13 or 13' of the sleeve, I preferably make the cone angle of the surface 18 slightly less (e. g., about 43°) than the cone angle of the surface 17 which may be about 45°. As the sleeve is forced into the seat 11a or 27 and inward radial compression of portion 13 or 13' is effected, the surfaces 17 and 18 are caused to conform substantially with one another as shown in the drawing.

Having thus described my invention, what I claim as new and desire to secure by Letters Patent of the United States is:

A pipe coupling of the class described comprising, in combination, a pipe receiving member having a cylindrical bore for receiving a pipe in circumferential engagement therewith and having an internal outwardly flared conical seat, a pipe engaging member having a conically tapered portion snugly engageable with said seat and a normally cylindrical portion extending from the narrow end of said tapered portion and having a weakened connection with said tapered portion, said cylindrical portion being peripherally engageable with said seat intermediate the ends thereof, the outer diameter of said cylindrical peripheral portion corresponding to the minimum diameter of said tapered portion and a nut member co-operable with said pipe receiving member and with said pipe engaging member for effecting movement of the latter axially inwardly of said seat to deform said cylindrical portion radially inwardly thereof relative to said tapered portion, and to compress the tapered portion radially inwardly thereof, said tapered portion being engageable with said seat to limit said axial inward movement of said pipe engaging member.

JOHN A. MATOUSEK.

REFERENCES CITED

The following references are of record in the file of this patent:

UNITED STATES PATENTS

| Number | Name | Date |
|---|---|---|
| 1,755,210 | Dohner | Apr. 22, 1930 |
| 2,211,856 | Kreidel | Aug. 20, 1940 |
| 2,394,351 | Wurzburger | Feb. 5, 1946 |

FOREIGN PATENTS

| Number | Country | Date |
|---|---|---|
| 97,131 | Sweden | Aug. 17, 1939 |
| 708,734 | France | May 4, 1931 |